R. E. SPRINGLE.
STOP DEVICE FOR GRAVITY MOTORS.
APPLICATION FILED SEPT. 23, 1910.
1,027,219.
Patented May 21, 1912.
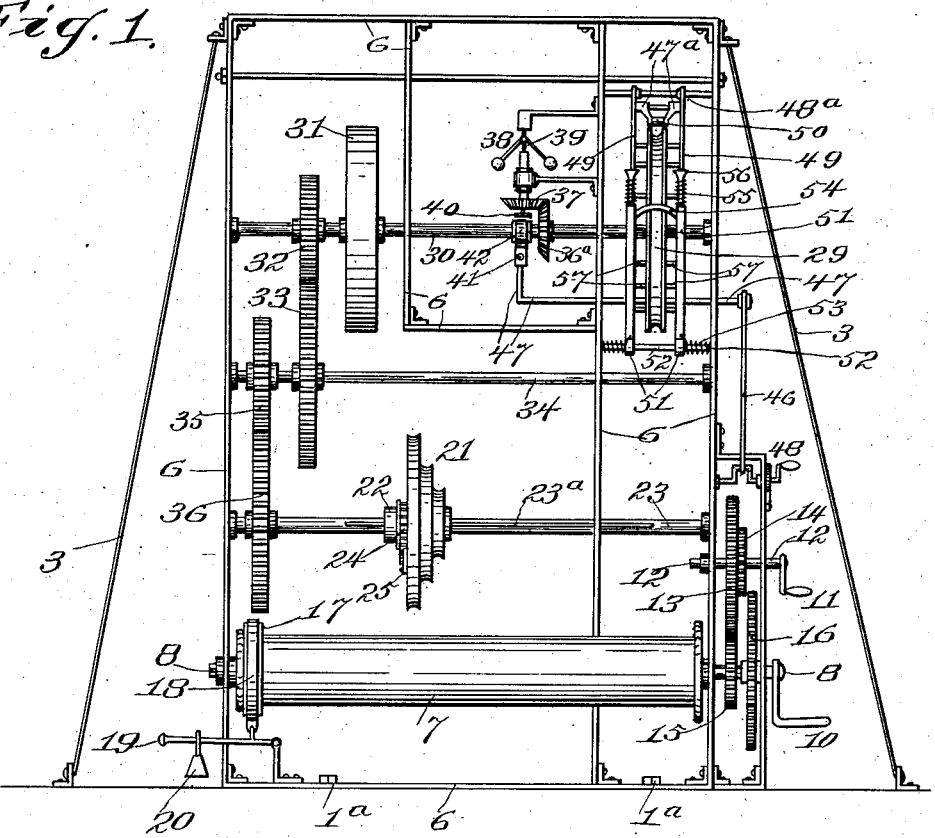
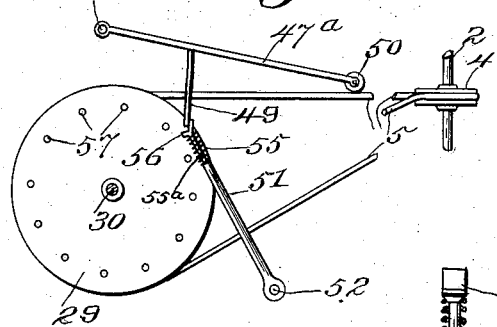
Witnesses
V. N. Whitman
W. F. Crossman
Inventor
Robert E. Springle
By ........ Attorney

UNITED STATES PATENT OFFICE.

ROBERT E. SPRINGLE, OF CAMDEN, ALABAMA.

STOP DEVICE FOR GRAVITY-MOTORS.

1,027,219.     Specification of Letters Patent.     Patented May 21, 1912.

Application filed September 23, 1910. Serial No. 583,470.

*To all whom it may concern:*

Be it known that I, ROBERT E. SPRINGLE, citizen of the United States, residing at Camden, in the county of Wilcox and State of Alabama, have invented certain new and useful Improvements in Stop Devices for Gravity-Motors, of which the following is a specification.

This invention relates to stop mechanism for gravity motors, and the object of the invention is to provide a stop device adapted to be operated by the slacking or breaking of a driving belt, for stopping the operation of the motor.

In the accompanying drawings forming part of this application:—Figure 1 is an elevation of a motor showing the application of the invention. Fig. 2 is a detail side elevation of the stop device. Fig. 3 is a detail section of one of the hollow rods and its attachments.

The same reference characters denote the same parts in the views of the drawings.

For the purpose of illustration, the stop device is shown in connection with a gravity motor for driving a shaft 2 provided with a sheave or pulley 4 to which motion is imparted by a belt 5. The motor mechanism is mounted on or in a metal frame 6, secured and anchored by bolts 1ª and guys 3, and said frame has proper journal bearings for the various shafts hereinafter referred to.

A windlass or drum 7 is mounted on a shaft 8 near the bottom of the frame 6, for a rope or cable (not shown) having one end attached to the drum. One end of the drum-shaft 8 is provided with a hand crank 10 for operating the drum in the winding of the rope thereon, or the rope may be wound on the drum under certain conditions if desired, by means of a hand crank 11 secured to a short shaft 12 slidable lengthwise in its bearings, and provided with a gear 13 and pinion 14 which are adapted to mesh with a pinion 15 and gear 16 respectively on this end of the shaft 8. The opposite end of the drum is provided with a friction rim or wheel 17, engaged by a brake shoe or band 18, which is controlled in its bearing upon said rim by a lever 19, having a weight 20 adjustable thereon to vary such bearing, for the purpose of preventing any slack or lost motion in the rope or cable between the drum and the variable speed or step pulleys 21, around any or either of which the rope or cable 9 passes according to the speed desired. The hub 22, upon which the said pulleys are loosely mounted, is keyed to a shaft 23 by a feather or key 23ª so as to follow the movement of the rope 9 on the drum lengthwise the latter inasmuch as said rope is not intended to overlap on the drum. The hub of the pulley 21, is provided with a ratchet wheel 24, engaged by a spring pawl 25, carried by one of the pulleys 21, so that the pulleys will remain idle during the winding of the rope on the drum, but the pawl and ratchet will couple the pulleys with the shaft 23, through the hub 22 during the unwinding of the rope.

The belt 5 is driven by a driving pulley 29, mounted on and revolved by a shaft 30, having a balanced wheel 31, and a pinion 32 meshing with a gear 33 on a shaft 34, which has a pinion 35, meshing with a gear 36 on the shaft 23. The shaft 30 is provided with a beveled gear 36ª, which meshes with a beveled pinion 37, of a governor 38, having a stem 39 working through the pinion 37, and against one end of a lever 40, which is pivoted at right angles to the shaft 30. The lever 40 may be operated by a hand lever 46, connected with the lever 40 by means of an angle lever 47, which is operated by a hand crank 48.

The stop device is operated by a belt tightener which consists of rods 47ª pivoted at 48ª and having depending arms 49 which straddle the pulley 29, and a roller 50 journaled in the free end of the rods 47ª and bearing on the belt 5. The stop device consists of a pair of hollow rods 51 loosely mounted on a rod 52, having spiral springs 53, a yoke 54 connecting the rods 51 which straddle the pulley 29, and are provided with spiral springs 55 to cushion the stems 55ª of a forked head 56, in the rods 51. Said heads are engaged by the arms 49 as long as the belt 5 is tight, but upon the belt becoming slack or in the event of its breaking, the arms 49 will release the forked heads and permit them to drop under or into engagement with stop-pins 57 projecting from each side of the pulley 29 and thereby automatically stop the pulley.

It will be seen that any undue slack in the belt 5, or the breaking, or dislodgment thereof, will automatically operate the stop device and simultaneously stop the revolution of the pulley 29.

Having thus described my invention what I claim as new and desire to secure by Letters Patent is:—

In a stop device, the combination with a driving pulley having a series of stop pins projecting from each side thereof, and a belt tightening rod, of a pair of arms depending from the tightening rod over the periphery of the pulley without engaging the pins, a pair of pin-engaging rods which straddle the pulley and engage the arms at an angle thereto for holding the pin-rods out of engagement with the pins, rods upon which the pin-rods are mounted, and springs for cushioning the pin-rods, said arms and rods adapted to be disengaged by the downward movement of the belt tightening rod for dropping the rods into engagement with the said pins.

In witness whereof I hereunto set my hand in the presence of two witnesses.

ROBERT E. SPRINGLE.

Witnesses:
J. B. HOLMAN, Jr.,
PATEN DONNELLY.

Copies of this patent may be obtained for five cents each, by addressing the "Commissioner of Patents, Washington, D. C."